J. C. LANDES.
AUTOMATIC GAS CONTROLLER.
APPLICATION FILED JAN. 29, 1908.
974,980.
Patented Nov. 8, 1910.
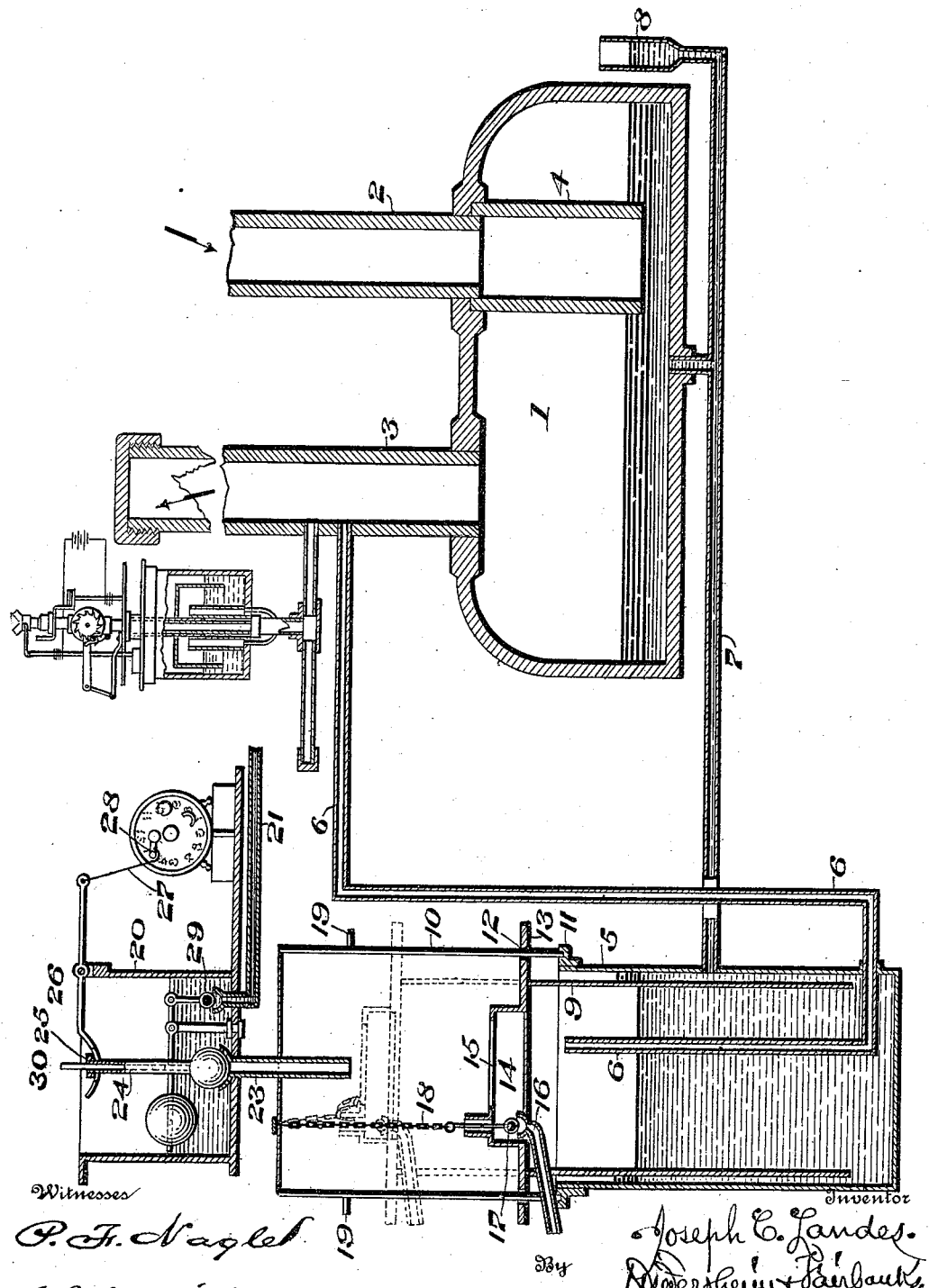

UNITED STATES PATENT OFFICE.

JOSEPH C. LANDES, OF COLLEGEVILLE, PENNSYLVANIA.

AUTOMATIC GAS-CONTROLLER.

974,980.  Specification of Letters Patent.  Patented Nov. 8, 1910.

Application filed January 29, 1908. Serial No. 413,310.

*To all whom it may concern:*

Be it known that I, JOSEPH C. LANDES, a citizen of the United States, residing at Collegeville, Montgomery county, State of Pennsylvania, have invented a new and useful Automatic Gas-Controller, of which the following is a specification.

This invention consists of a device to automatically control or regulate the pressure of gas in a distributing main.

It further consists of a receiving tank having a gas inlet and outlet and connections leading from said tank to a float chamber located adjacent the tank, whereby a liquid level is normally maintained between the tank and float chamber but which is varied at a certain time to produce a liquid seal over the gas inlet.

It further consists of a receiving tank having a gas inlet and a distributing gas outlet, the pressure in which is automatically varied at a predetermined time by means of a float located in a chamber adjacent the receiving tank and operated by gravity means which is controlled by a suitable timing mechanism.

It further consists of other novel features of construction, all as will be hereinafter fully set forth.

For the purpose of illustrating my invention, I have shown one embodiment thereof which has been found in practice to give satisfactory and reliable results, although it is to be understood that the various instrumentalities of which my invention consists can be variously arranged and organized and that the invention is not limited to the precise arrangement and organization of these instrumentalities, as herein shown and described.

The figure represents a sectional elevation of an apparatus embodying my invention showing diagrammatically one form of lighting apparatus.

Similar numerals of reference indicate corresponding parts in the figures.

Referring to the drawings. 1 designates a gas reservoir provided with a gas inlet pipe 2 and an outlet pipe 3, the latter serving as a distributing main to a plurality of gas lamps or the like located at suitable desirable points. A section of pipe 4 is secured in alinement with the inlet pipe 2 and forms an extension therefor which brings the inlet mouth in close proximity to the bottom of the reservoir 1.

Adjacent the reservoir 1 is a chamber 5 adapted to contain a liquid and connected to the reservoir 1 by pipes 6 and 7 whereby a liquid level is maintained between the two vessels. The pipe 6 serves as a gas by-pass from the distributing pipe 3 and preferably enters near the bottom of the chamber 5 and is bent upward to a point near the top of the chamber in order that the gas may be liberated above the liquid within the chamber 5. The pipe 7 connects the water space in the reservoir 1 with that of the chamber 5 so that the liquid level is the same in both vessels and under normal conditions assumes a level just below the mouth of the inlet extension 4.

The chamber 5 is closed at its upper end by the top 13 of the float 9 which depends therefrom and loosely telescopes within the chamber 5 to form a liquid space therebetween.

10 designates guides suitably mounted on brackets 11 attached to the chamber 5 and are adapted to pass through apertures 12 in the top 13 and accurately center the member 9. A receptacle 14 having an inlet 15 and an outlet 16 is suitably secured to the top 13 and is adapted to receive a gravity means for lowering the float 9 upon the chamber 5. The inlet 15 is preferably made of some width whereby the gravity means, in the present instance, a liquid, may be accurately received in the receptacle 14.

The outlet 16 is provided with a valve 17, the operation of which is automatic and dependent upon conditions to be hereinafter described. As here shown, the valve 17 consists of a ball suspended by a chain 18 suitably supported on the connecting cross-bar of the guides 10.

It will be noted that the top 13 is adapted for a rising and falling movement which is limited in one direction by the chamber 5 and in the other by lugs 19 secured to the guides 10 at a point sufficiently high to insure operation of the device. In the present instance the raising of the float 9 is controlled by the gas pressure while a gravity means serves to overcome this pressure and lower the said float 9 at a predetermined time. It will be apparent that as the gas enters the pipe 3 from the reservoir 1, a portion thereof is led by the pipe 6 into the interior of the top extension 9, whereby a pressure is created above the liquid contained therein, which is sufficient to raise the float 9, as indicated in dotted lines, to the normal operative position. When in this position the pressure in the reservoir 1 and within the member 9 are practically the same and consequently the liquid level is the same and is just below the extension 4, so that the gas has a free inlet. Directly above the top 13 and in close proximity to the inlet 15 in the receptacle 14 is located an outlet pipe 23 leading from an auxiliary vessel 20 containing water or other liquid supplied from a feed pipe 21 whenever the level is lowered sufficiently to allow float 22 to open control valve 29. The outlet 23 is controlled by any suitable type of ball valve herein disclosed as a ball mounted on a hollow stem 24 sliding on a suitably supported rod 30, said stem 24 carrying a stop 25 adapted to be engaged by the forked member 26 operated intermittently as the action of the timing apparatus takes place. The member 26 is suitably pivoted to the vessel 20 and is automatically operated in any suitable manner. In the present instance, I provide a link 27 one end of which is secured to the member 26 and the other end is located in the path of an arm 28 forming a rotating part of a suitable clock and which engages and pulls down the hooked end of link 27 whenever the clock is set for a certain predetermined time.

It will of course be understood that the conduit 3 forms a main for carrying the gas to suitable points of distribution at which points it is delivered to a suitable automatic lighting device of any well known type. It will further be seen that the conduit 3 is closed throughout its length except at the points where the pipes are tapped for the purpose of communicating with the lighting devices.

The operation of the device is as follows:—In the normal position of the apparatus the gas from the main has free access through the pipe 2 to the reservoir 1, to the distributing pipe 3, to the by-pass 6 leading to the interior of the chamber 5 and extension 9. The normal pressure of the gas in the pipe 3 is not sufficient to operate the automatic gas controller (not shown) but any increase in pressure either within the reservoir 1 or the chamber 9 will serve to perform this function. In dotted lines the position of the top member is shown under normal conditions, the valve 17 being of course closed at this time. If it is desired to either turn on or extinguish the lights at a certain time, the clock is set for this time and the hook of the link 27 placed in position to be engaged by the arm 28 when it is rotated. When the clock reaches the hour set, the mechanism is released and the arm 28 immediately pulls down the link 27, which through its connections raises the valve 24 from its seat, allowing the liquid in the auxiliary receptacle 20 to escape through the outlet 23 and enter the chamber 14 through the inlet 15. The weight of the water is in excess of the gas pressure beneath the top member 9 which is lowered and the gas within the chamber 5 is compressed and forces the liquid back through the pipe 7 to raise the level in the receptacle 1 and effectually seals the inlet 4. The increase in the gas pressure is of course transmitted through the by-pass 6 to the distributing pipe 3 and then actuates the automatic gas control to either turn on or extinguish the lamps, as the case may be.

It will be noted that as the top 13 reaches its lowest position the chain 18 has become taut and opens the ball-valve 17 to allow the liquid within the receptacle 14 to escape whereby the gas pressure again raises the top 13 to its normal position and the apparatus again becomes ready for use.

Having thus described my invention, what I claim as new and desire to secure by Letters Patent, is:—

1. In a device of the character described, a reservoir, a gas inlet provided with an extension, a gas outlet, and time controlled means to seal said gas inlet at a predetermined time, whereby gas pressure in said reservoir is varied.

2. In a device of the character described, a reservoir, a gas inlet and outlet therefor, a chamber adjacent thereto, means to establish a liquid level between said reservoir and chamber, and time controlled means coöperating with said chamber to vary the gas pressure in said reservoir at a predetermined time.

3. In a device of the character described, a reservoir, a gas inlet and outlet therefor, a chamber adjacent thereto, means to establish a liquid level between said reservoir and chamber and automatic means coöperating with said chamber to vary the gas pressure in said reservoir at a predetermined time.

4. In a device of the character described, a reservoir, a gas inlet and outlet therefor, a chamber adjacent thereto, a plurality of connections between said reservoir and chamber, and automatic means coöperating with said chamber to vary the gas pressure in said reservoir at a predetermined time.

5. In a device of the character described, a reservoir a gas inlet and outlet therefor, a chamber adjacent thereto, gas and liquid connections between said reservoir and chamber, a float for said chamber, and means to raise and lower said float at a predetermined time to vary the gas pressure in said reservoir.

6. In a device of the character described, a reservoir, a gas inlet and outlet therefor, a chamber adjacent thereto, gas and liquid connections between said reservoir and chamber, a float for said chamber, pressure means to raise said float, and means to lower said float at a predetermined time to vary the gas pressure in said reservoir.

7. In a device of the character described, a gas inlet and outlet therefor, a chamber adjacent thereto, gas and liquid connections between said reservoir and chamber, a float for said chamber, pressure means to raise said float, and gravity means to lower said float at a predetermined time to vary the gas pressure in said reservoir.

8. In a device of the character described, a reservoir, a gas inlet and outlet therefor, a chamber adjacent said reservoir, gas and liquid connections between said reservoir and chamber, a float for said chamber having a receptacle thereon, an inlet and outlet for said receptacle, an auxiliary tank containing liquid, a valve therefor adjacent said float receptacle, and means to open said valve at a predetermined time, whereby said float is lowered.

JOSEPH C. LANDES.

Witnesses:
ROBERT M. BARR,
C. D. McVAY.